US009201213B2

(12) United States Patent
Ono

(10) Patent No.: US 9,201,213 B2
(45) Date of Patent: Dec. 1, 2015

(54) IMAGING LENS AND IMAGING APPARATUS

(71) Applicant: FUJIFILM Corporation, Tokyo (JP)

(72) Inventor: Kazunori Ono, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/451,456

(22) Filed: Aug. 5, 2014

(65) Prior Publication Data

US 2014/0347749 A1    Nov. 27, 2014

Related U.S. Application Data

(63) Continuation of application No. PCT/JP2013/000517, filed on Jan. 31, 2013.

(30) Foreign Application Priority Data

Feb. 6, 2012  (JP) .................................. 2012-022935

(51) Int. Cl.
*G02B 13/02* (2006.01)
*G02B 9/64* (2006.01)
*G02B 13/00* (2006.01)

(52) U.S. Cl.
CPC . *G02B 9/64* (2013.01); *G02B 13/00* (2013.01)

(58) Field of Classification Search
CPC .................................. G02B 9/63; G02B 13/02
USPC ......................... 359/745, 746, 747, 748, 754
See application file for complete search history.

(56) References Cited

U.S. PATENT DOCUMENTS

| | | | |
|---|---|---|---|
| 4,466,708 A | 8/1984 | Betensky | |
| 4,639,095 A | 1/1987 | Kato | |
| 4,871,239 A | 10/1989 | Masumoto et al. | |
| 8,416,506 B2* | 4/2013 | Ito | G02B 15/173 359/687 |
| 2007/0109665 A1* | 5/2007 | Wakazono | G02B 15/17 359/687 |
| 2011/0037878 A1* | 2/2011 | Wakazono | G02B 27/0062 348/240.3 |
| 2011/0149118 A1 | 6/2011 | Misaka | |
| 2011/0304929 A1 | 12/2011 | Tsutsumi | |

FOREIGN PATENT DOCUMENTS

| | | |
|---|---|---|
| JP | 58-117514 | 7/1983 |
| JP | 58-199313 | 11/1983 |
| JP | 63-66523 | 3/1988 |
| JP | 09-90223 | 4/1997 |
| JP | 2010-033061 | 2/2010 |

(Continued)

OTHER PUBLICATIONS

International Search Report PCT/JP2013/000517 dated Apr. 2, 2013.

*Primary Examiner* — Scott J Sugarman

(74) *Attorney, Agent, or Firm* — Young & Thompson

(57) ABSTRACT

The imaging lens substantially consists of a first lens group, a stop, a positive second lens group which is a focusing group, and a third lens group in this order from the object side. The first lens group substantially consists of a positive first sub lens group composed of a negative meniscus lens, a positive meniscus lens, and a positive lens; and a second sub lens group including a negative lens and a cemented lens, in this order from the object side. The second lens group substantially consists of a positive single lens or a cemented lens. The third lens group substantially consists of a cemented lens, a positive lens, and a negative lens in this order from the object side.

14 Claims, 13 Drawing Sheets

EXAMPLE 1

(56) References Cited

FOREIGN PATENT DOCUMENTS

| | | |
|---|---|---|
| JP | 2010-262154 | 11/2010 |
| JP | 2011-064919 | 3/2011 |
| JP | 2011-128273 | 6/2011 |
| JP | 2011-128371 | 6/2011 |

* cited by examiner

EXAMPLE 4

EXAMPLE 5

IMAGING LENS AND IMAGING APPARATUS

CROSS-REFERENCE TO RELATED APPLICATIONS

This application is a Continuation of PCT International Application No. PCT/JP2013/000517 filed on Jan. 31, 2013, which claims priority under 35 U.S.C. §119(a) to Japanese Patent Application No. 2012-022935 filed Feb. 6, 2012. Each of the above application (s) is hereby expressly incorporated by reference, in its entirety, into the present application.

BACKGROUND OF THE INVENTION

1. Technical Field

The present invention relates to an imaging lens and an imaging apparatus, and more particularly to an imaging lens that can be used for a digital camera, a broadcasting camera, a movie camera, and the like as well as an imaging apparatus provided with the imaging lens.

2. Description of the Related Art

In recent years, there is great demand for cameras in the above fields to have a small F-number which allows photography in a dark place and to have high performance which can be compatible with recent high-definition imaging elements. Moreover, for example, some of movie cameras, and the like are provided with a mechanism for driving power focus of a focusing group (a lens group which moves while focusing) such as an autofocus mechanism, and the like, and have many opportunities to photograph a subject which is moving so that there is demands for a lightweight focusing group and suppression of aberration fluctuations and fluctuations in the angle of view in order to be excellent in responsiveness to focusing when the distance to a subject is changed. Taking these circumstances into consideration, the inner focus lens system is often adopted. The inner focus lens system includes lens systems disclosed in Patent Documents 1, 2, and 3 (Japanese Unexamined Patent Publication No. 2010-033061, Japanese Unexamined Patent Publication No. 2011-064919, and Japanese Unexamined Patent Publication No. 2011-128273).

SUMMARY OF THE INVENTION

However, the lens systems disclosed in Patent Documents 1 and 2 are floating focus systems that move two lens groups along different paths. Therefore, focusing groups will be heavy, driving mechanisms will be complex, and responsiveness will be encumbered. As the lens system disclosed in Patent Document 3 includes a focusing group constituted of three lenses, there are cases where reduction in weight of the focusing group is demanded according to a recent requirement specification.

The present invention has been developed in view of the above circumstances. It is an object of the present invention to provide an imaging lens having a smaller F-number and higher optical performance, in which lightweight of a focusing group is achieved and aberration fluctuations and fluctuations in the angle of view during focusing are reduced; and an imaging apparatus including such an imaging lens.

An imaging lens of the present invention substantially consists of three lens groups in which a first lens group which is fixed while focusing, a stop, a second lens group having positive refractive power which moves toward the object side while focusing from an object at infinity to an object at the closest distance, and a third lens group which is fixed while focusing are arranged in this order from the object side;

the first lens group substantially consists of a first sub lens group having positive refractive power and a second sub lens group having negative refractive power in this order from the object side;

the first sub lens group substantially consists of a negative meniscus lens with a convex surface toward the object side, a positive meniscus lens with a convex surface toward the object side, and a positive lens in this order from the object side;

the second sub lens group includes a negative lens with a concave surface toward the image side, of which an absolute value of a radius of curvature on an image-side surface is smaller than that on the object side, and a cemented lens formed by cementing a negative lens and a positive lens together, in this order from the object side;

the second lens group substantially consists of a positive single lens or a cemented lens formed by cementing a negative lens and a positive lens together;

the third lens group substantially consists of a cemented lens formed by cementing a positive lens and a negative lens together, a positive lens, and a negative lens in this order from the object side; and conditional expressions (1) and (2) below are satisfied:

$$0.4 < f2/f < 2.0 \tag{1}$$

$$0.05 < \beta 2 < 0.8 \tag{2}, \text{where}$$

f2: the focal length of the second lens group,
f: the focal length of the entire system when focusing on an object at infinity, and
β2: the image magnification of the second lens group with respect to the first lens group when focusing on an object at infinity.

It is preferable for the imaging lens of the present invention to satisfy conditional expression (1') below:

$$0.6 < f2/f < 1.6 \tag{1'}$$

It is preferable for the imaging lens of the present invention to satisfy conditional expression (2') below:

$$0.06 < \beta 2 < 0.6 \tag{2'}$$

It is preferable for the imaging lens of the present invention to satisfy conditional expression (3) below, and more preferably conditional expression (3') below to be satisfied:

$$0.2 < |f1a/f1b| < 1.6 \tag{3}$$

$$0.3 < |f1a/f1b| < 1.5 \tag{3'}, \text{where}$$

f1a: the focal length of the first sub lens group, and
f1b: the focal length of the second sub lens group.

It is preferable for the imaging lens of the present invention to satisfy conditional expression (4) below, and more preferably conditional expression (4') below to be satisfied:

$$1.0 < |f1n/f1a| < 6.0 \tag{4}$$

$$1.3 < |f1n/f1a| < 4.5 \tag{4'}, \text{where}$$

f1a: the focal length of the first sub lens group, and
f1n: the focal length of the negative meniscus lens of the first sub lens group.

It is preferable for the imaging lens of the present invention to satisfy conditional expression (5) below, and more preferably conditional expression (5') below to be satisfied:

$$0.05 < f/f1 < 0.9 \tag{5}$$

$$0.07 < f/f1 < 0.8 \tag{5'}, \text{where}$$

f1: the focal length of the first lens group.

It is preferable for the imaging lens of the present invention to satisfy conditional expression (6) below, and more preferably conditional expression (6') below to be satisfied:

$$45 < vn < 75 \quad (6)$$

$$50 < vn < 72 \quad (6'),\text{ where}$$

vn: the Abbe number with respect to the d-line of the negative lens which constitutes the cemented lens on the most-image side in the second sub lens group.

It is preferable for the imaging lens of the present invention to satisfy conditional expression (7) below, and more preferably conditional expression (7') below to be satisfied:

$$0.4 < |f3c/f| < 2.0 \quad (7)$$

$$0.5 < |f3c/f| < 1.8 \quad (7'),\text{ where}$$

f3c: the focal length of the cemented lens of the third lens group.

An imaging apparatus of the present invention includes the imaging lens of the present invention described above.

Note that the above expression "lens group" is not necessarily composed of a plurality of lenses, but may also refer to lens groups which are composed of only a single lens.

Note that the expression "substantially" of "substantially consists of three lens groups" intends to mean that the imaging lens of the present invention may include lenses substantially without any refractive power; optical elements other than lenses such as stops, cover glasses, filters, and the like; and mechanical components such as lens flanges, lens barrels, imaging elements, and camera shake correction mechanisms; in addition to the constituent elements listed above. The same applies to the other expressions "substantially" described above. Note that the surface shapes and the signs of the refractive powers of the above lens should be considered in paraxial regions if aspheric surfaces are included therein.

The imaging lens of the present invention substantially consists of a first lens group, a stop, a positive second lens group, and a third lens group in this order from the object side; the first lens group substantially consists of a positive first sub lens group and a negative second sub lens group in this order from the object side in a lens system which moves the second lens group while focusing; a lens configuration of each of the lens groups is particularly set; and conditional expressions (1) and (2) are satisfied. This enables a small F-number and high performance of the lens as well as allowing reduction in weight of a focusing group and suppression of aberration fluctuations and fluctuations in the angle of view while focusing.

Further, since the imaging apparatus according to the present invention includes the imaging lens of the present invention, the imaging apparatus allows a photography even under a low illuminance condition and acquisition of excellent images with a wide angle of view, enabling a rapid focusing with respect to a subject which is moving and reduction of fluctuations in performance and the angle of view while focusing.

Figure 7:
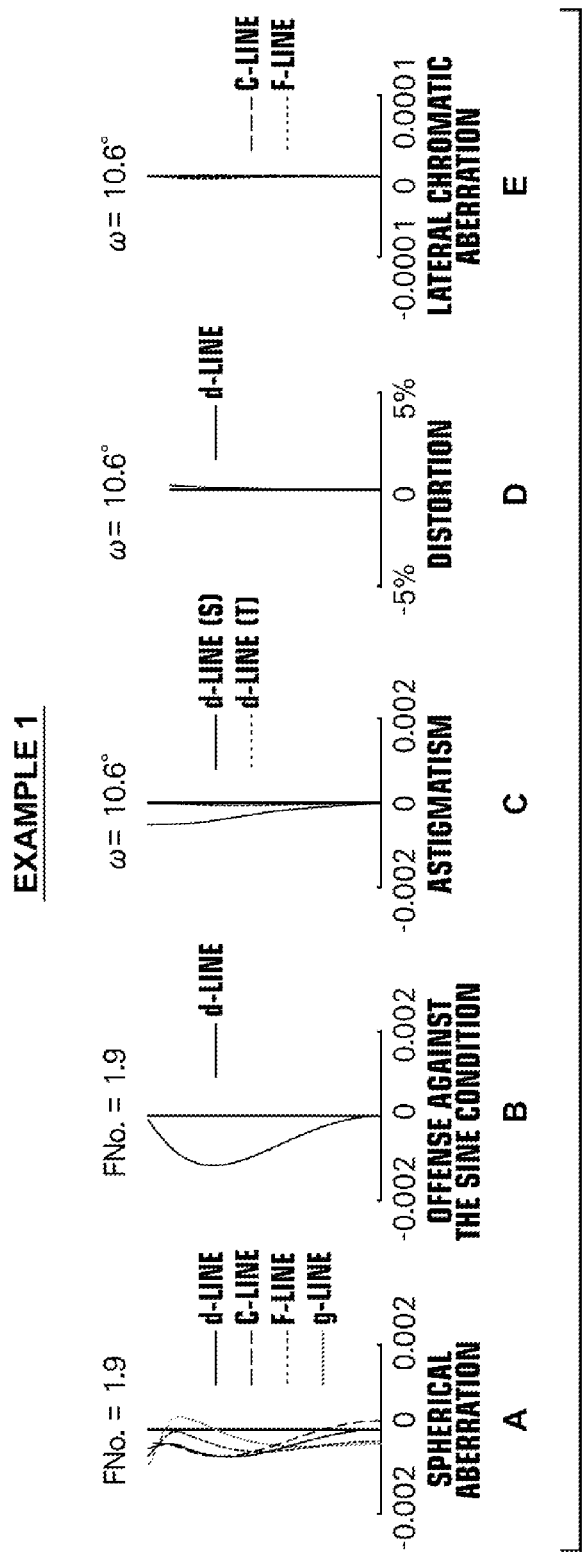

A through E of FIG. 7 respectively illustrate aberration diagrams of the imaging lens of Example 1 of the present invention.

Figure 8:
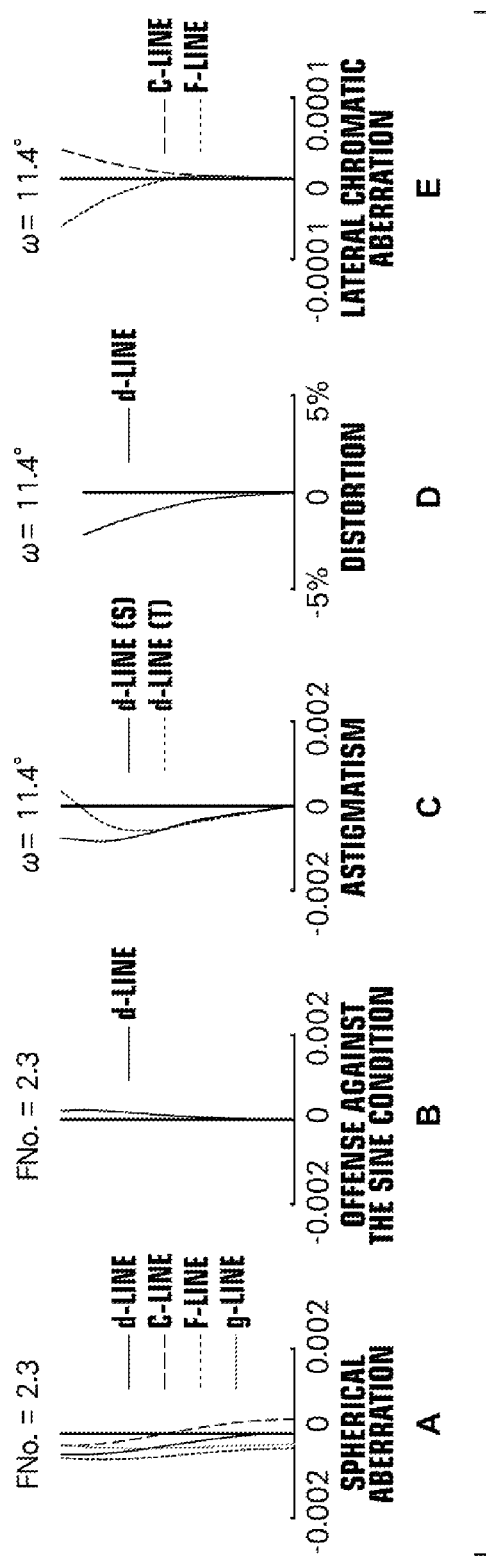

A through E of FIG. 8 respectively illustrate aberration diagrams of the imaging lens of Example 2 of the present invention.

Figure 9:
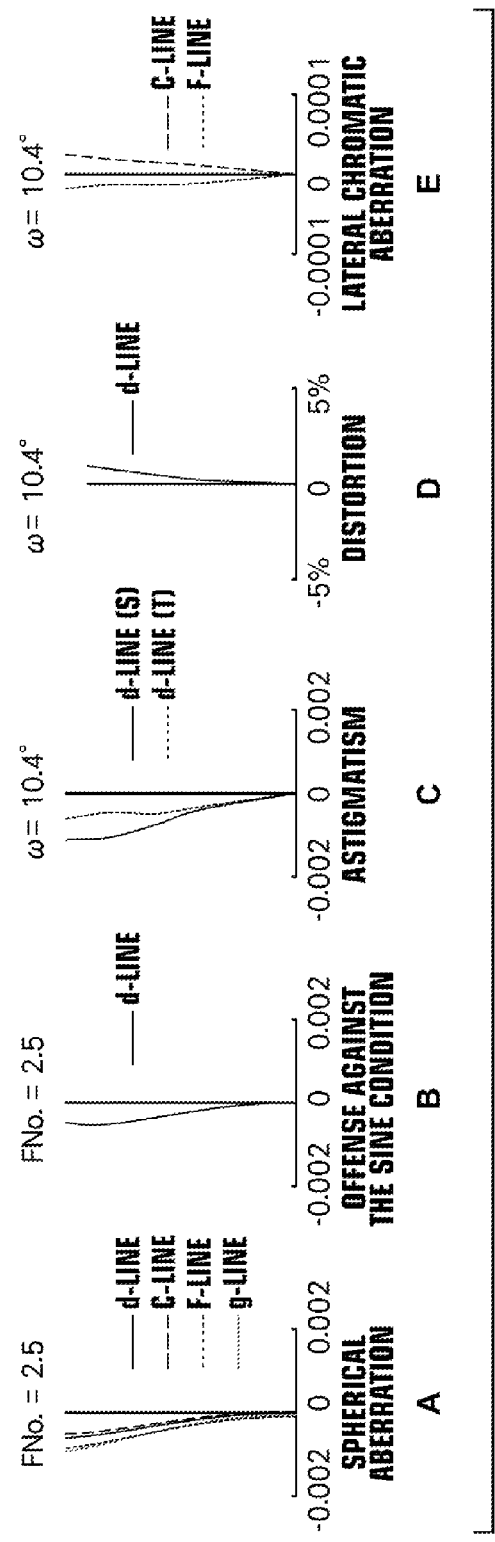

A through E of FIG. 9 respectively illustrate aberration diagrams of the imaging lens of Example 3 of the present invention.

Figure 10:
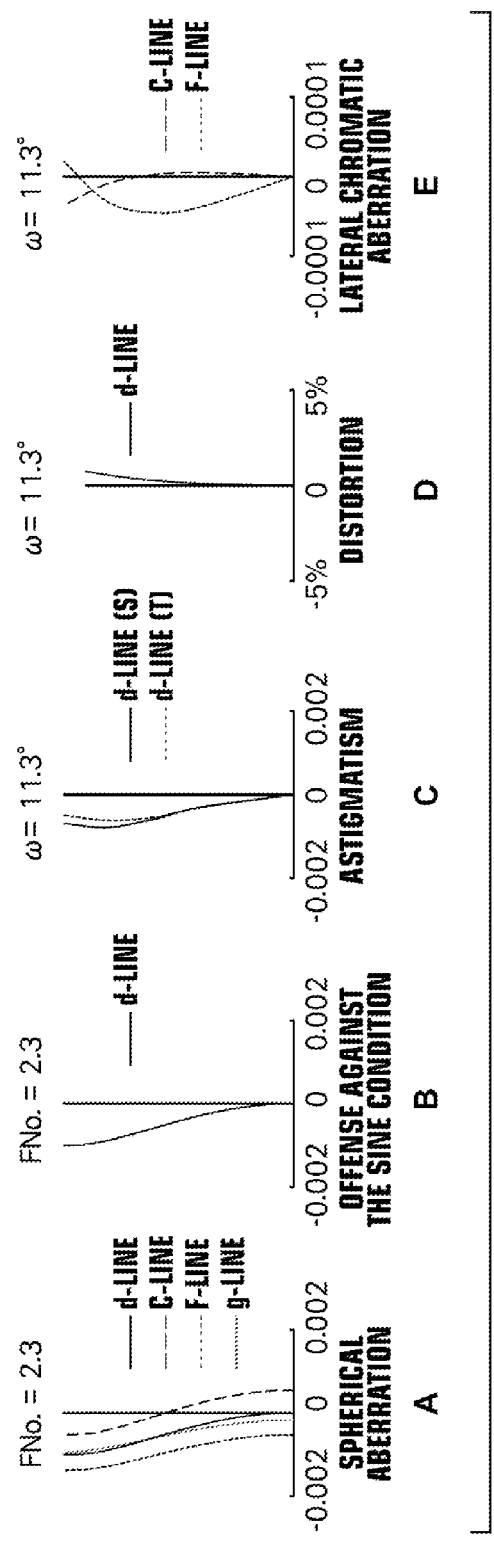

A through E of FIG. 10 respectively illustrate aberration diagrams of the imaging lens of Example 4 of the present invention.

Figure 11:
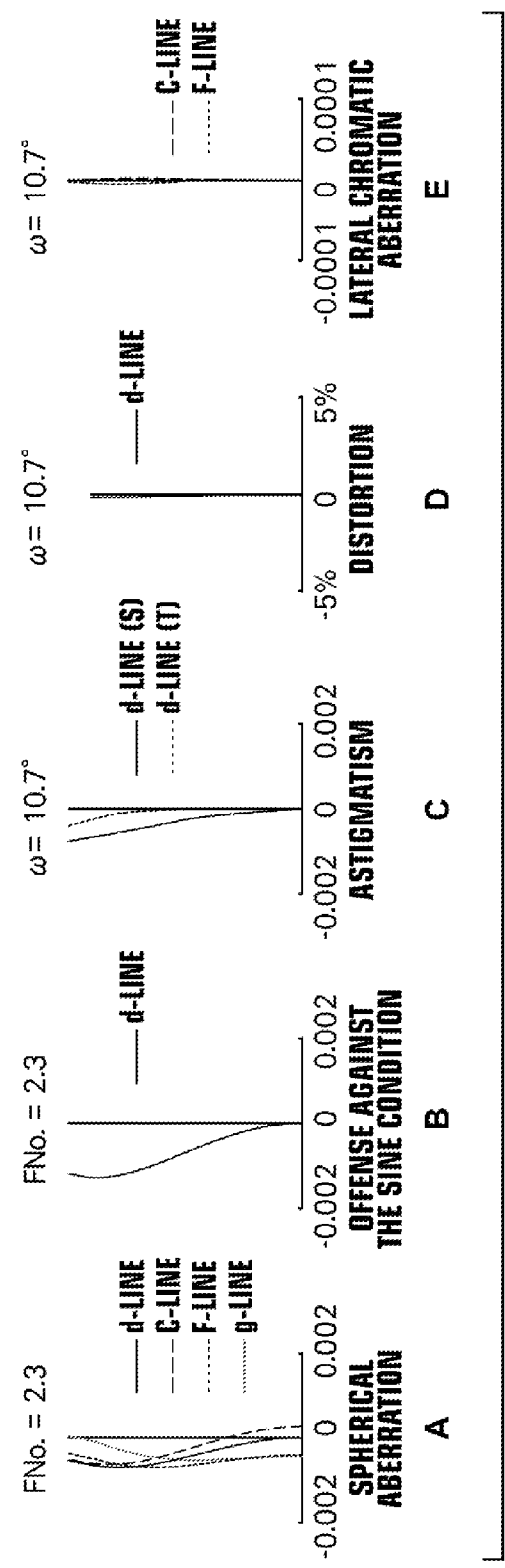

A through E of FIG. 11 respectively illustrate aberration diagrams of the imaging lens of Example 5 of the present invention.

Figure 12:
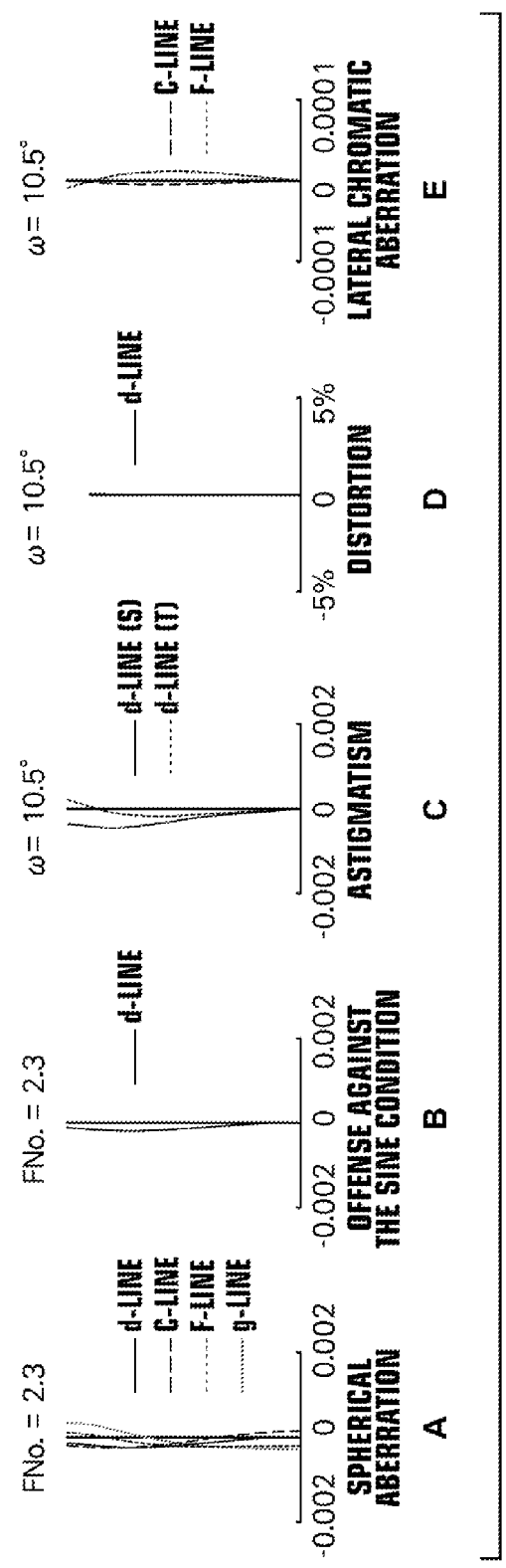

A through E of FIG. 12 respectively illustrate aberration diagrams of the imaging lens of Example 6 of the present invention.

Figure 13:
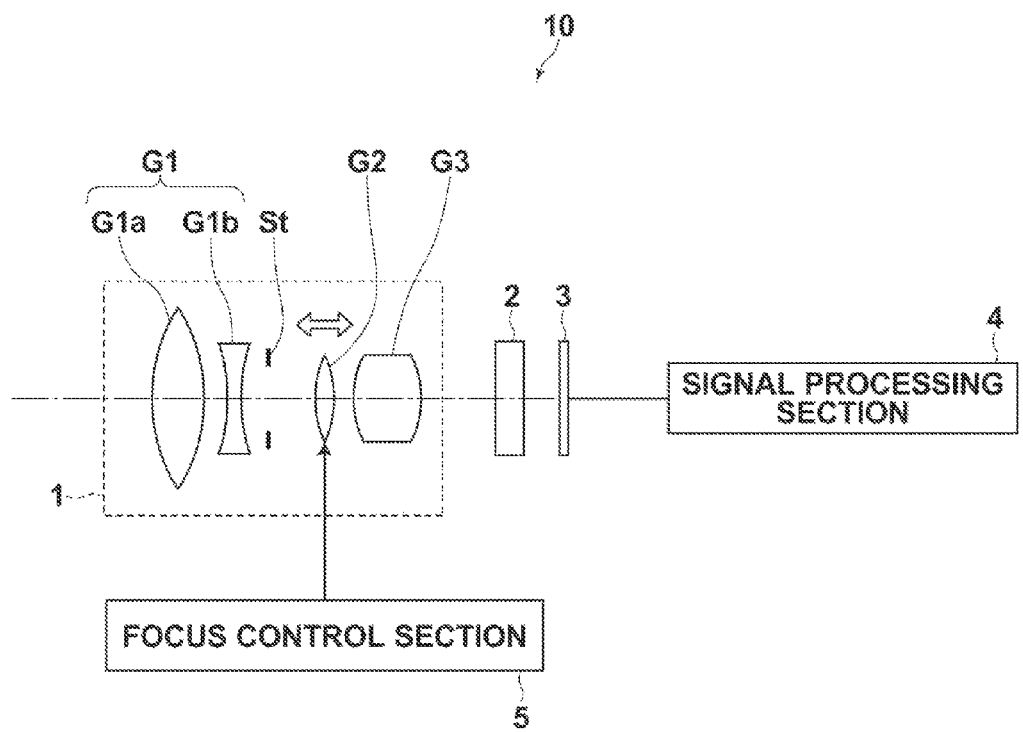

FIG. 13 is a schematic configuration of an imaging apparatus according to one embodiment of the present invention.

DESCRIPTION OF THE PREFERRED EMBODIMENTS

Hereinafter, embodiments of the present invention will be described in detail with reference to the accompanying drawings. Each of FIGS. 1 through 6 is a cross-sectional view of the imaging lens according to the embodiments of the present invention. FIGS. 1 through 6 corresponds to Example 1 through 6 to be described later, respectively. In FIGS. 1 through 6, the left side is the object side, and the right side is the image side. Each of FIGS. 1 through 6 shows a state focused on an object in infinity. Note that the symbols L11 through L17, L21, L22, and L31 through L34 which are used in FIGS. 1 through 6 are independently applied for each Figure so as to prevent the description from becoming complex due to an increased number of digits of the symbols. Accordingly, even if the same symbol is applied as in other Figures, they do not necessarily represent the same configuration. Note that since the basic configurations illustrated in FIGS. 1 through 6 and the manners in which the configurations are illustrated therein are all the same, a description will be given mainly with reference to the configuration shown in FIG. 1 as a representative example.

The imaging lens of the present embodiments substantially consists of three lens groups which are a first lens group G1, an aperture stop St, a second lens group G2 having positive refractive power, and a third lens group G3 arranged in this order from the object side along the optical axis Z. Note that the aperture stop St shown in each of FIGS. 1 through 6 does not necessarily represent the size or shape thereof, but the position thereof on the optical axis Z.

Figure 1:
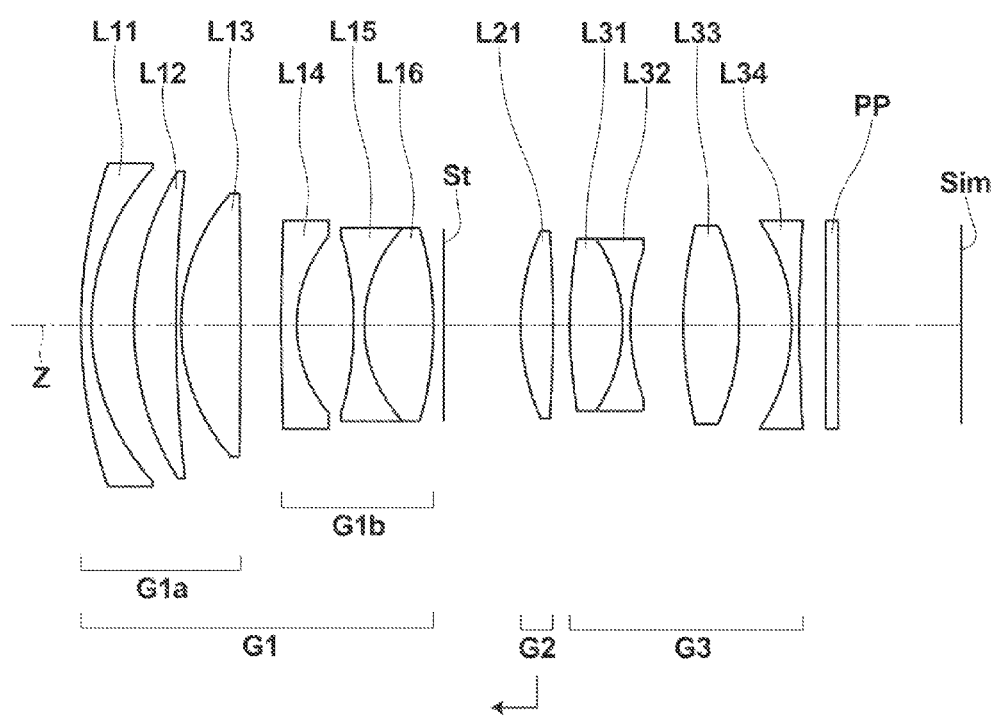
FIG. 1 is a cross-sectional view illustrating the lens configuration of an imaging lens of Example 1 of the present invention.

When this imaging lens is applied to an imaging apparatus, it is preferable for a cover glass, various types of filters, such as an infrared cut filter, a low-pass filter, and the like to be provided between the optical system and the image surface Sim according to the configurations of a camera on which the lens is mounted. FIG. 1 illustrates an example in which a plane parallel optical member PP that presumes such filters is provided between the third lens group G3 and an image surface Sim.

While focusing from an object at infinity to an object at the closest distance, the first lens group G1 and the third lens group G3 are configured to be fixed and the second lens group G2 is configured to move toward the object side. By adopting such an inner focus lens system, reduction in weight of a lens group which moves while focusing and suppression of aberration fluctuations during focusing can be achieved, compared to a lens that adopts an entire extending system. This advantageous effect becomes more prominent particularly as the focal length of the lens system is longer.

The first lens group G1 substantially consists of a first sub lens group G1a having positive refractive power and a second sub lens group G1b having negative refractive power in this order from the object side. By configuring the first lens group G1 in such a manner, a substantially afocal optical system can be constituted by these two sub lens groups. This allows a ray emitted from this substantially afocal optical system to enter the second lens group G2 through the aperture stop St, changes in the height of the ray while focusing to be reduced, and aberration fluctuations and fluctuations in the angle of view to be lessen.

The first sub lens group G1a substantially consists of a negative meniscus lens with a convex surface toward the object side, which is a lens 11, a positive meniscus lens with a convex surface toward the object side, which is a lens L12, and a positive lens which is a lens L13 in this order from the object side.

By disposing a negative meniscus lens with a convex surface toward the object side on the most-object side of the first sub lens group G1a, field curvature will be advantageously corrected excellently, thereby contributing to flatness of an image surface over the entire imaging region. Moreover, by disposing a positive meniscus lens with a convex surface toward the object side following the negative meniscus lens, flatness of an image surface will be advantageously obtained, and furthermore a converging effect will be imparted to the axial light flux that exits the negative meniscus lens, which tends to diverge, so as to lower the height of the rays. Thereby, the amount of occurrence of spherical aberration can be suppressed.

The second sub lens group G1b includes a negative lens with a concave surface toward the image side, of which an absolute value of a radius of curvature on the-image-side surface is smaller than that on the object side, and a cemented lens formed by cementing a negative lens and a positive lens together in this order from the object side. By the second sub lens group G1b including a negative lens with a concave surface toward the image side, of which an absolute value of a radius of curvature on the-image-side surface is smaller than that on the object side, spherical aberration and field curvature can be advantageously corrected excellently. By including a cemented lens on the image side in the second sub lens group G1b, the cemented lens will be positioned in the vicinity of the aperture stop St. This is advantageous from the viewpoint of excellently correcting longitudinal chromatic aberration.

Figure 3:
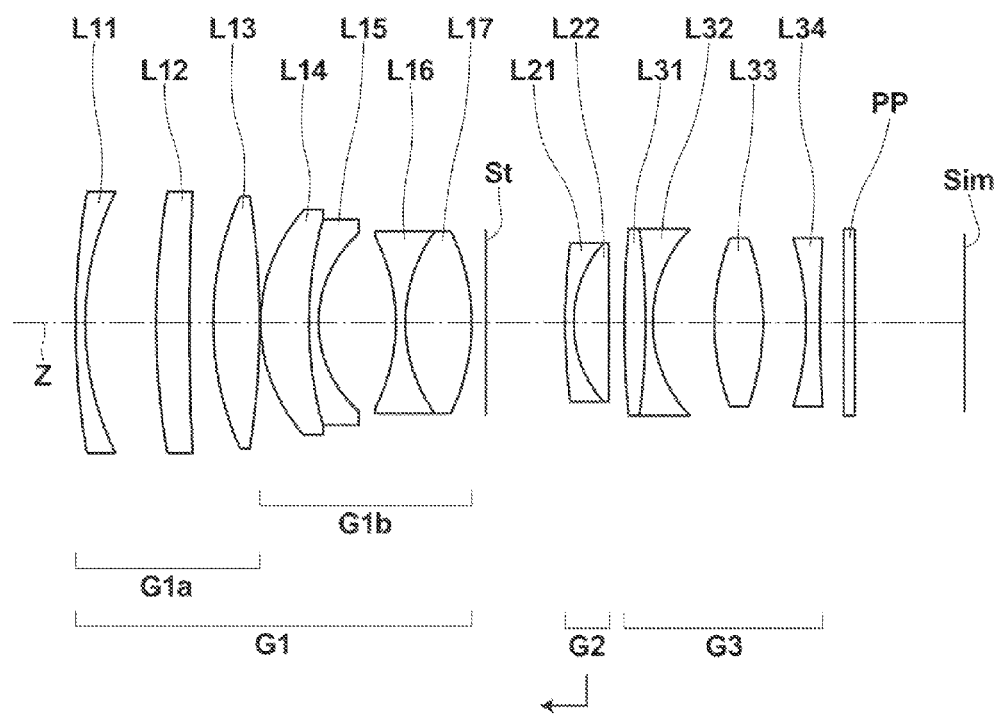
FIG. 3 is a cross-sectional view illustrating the lens configuration of an imaging lens of Example 3 of the present invention.

The second sub lens group G1b shown in the example of FIG. 1 consists of three lenses L14 through L16 which respectively correspond to the above lenses. Note that the second sub lens group G1b may be of a four-lens constitution in which a positive lens is included on the object side of the above three lenses, as shown in the example of FIG. 3. The second sub lens group G1b in the example of FIG. 3 consists of four lenses L14 through L17 in this order from the object side, and more particularly consists of two pairs of cemented lenses which are a cemented lens formed by cementing a positive lens and a negative lens together and a cemented lens formed by cementing a negative lens and a positive lens together, arranged in this order from the object side.

The second lens group G2 is disposed immediately adjacent to the aperture stop St toward the image side. By disposing the second lens group G2 in such a manner, the height of a ray of the off-axis light flux which passes through the second lens group G2 can be lower, a lens diameter of the second lens group G2 can be small, and the second lens group G2 which is a focusing group can be light.

The second lens group G2 may consist of a positive single lens or may consist of only a set of a cemented lens formed by cementing a negative lens and a positive lens together. In the case that the second lens group G2 consists of only a positive single lens, a biconvex lens or a positive meniscus lens may be applied. The second lens group G2 shown in the example of FIG. 1 consists of only a lens L21 which is a biconvex lens. The second lens group G2 shown in the example of FIG. 3 consists of only a cemented lens formed by cementing a lens L21 which is a negative meniscus lens and a lens L22 which is a biconvex lens together.

By constituting the second lens group G2 by a positive single lens or only a set of a cemented lens, reduction in weight of the focusing group can be achieved. In the case that the second lens group G2 consists of only a positive single lens, reduction in weight can be very advantageously achieved. In the case that the second lens group G2 consists of only a set of a cemented lens, aberration fluctuations while focusing can be advantageously suppressed.

The third lens group G3 substantially consists of a cemented lens formed by cementing a positive lens and a negative lens together, a positive lens, and a negative lens in this order from the object side. The third lens group G3 shown in the example of FIG. 1 consists of a cemented lens formed by cementing a lens 31 which is a biconvex lens and a lens L32 which is a biconcave lens together, a lens L33 which is a biconvex lens, and a lens L34 which is a biconcave lens.

By configuring the first lens group G1 through the third lens group G3 in such a manner as described above, a small F-number and high performance can be achieved, reduction in weight of a focusing group can be attained, and aberration fluctuations and fluctuations in the angle of view while focusing can be advantageously suppressed.

This imaging lens is configured to satisfy conditional expressions (1) and (2) below:

$$0.4 < f2/f < 2.0 \quad (1)$$

$$0.05 < \beta2 < 0.8 \quad (2),$$ where f2: the focal length of the second lens group,
f: the focal length of the entire system when focusing on an object at infinity, and
β2: the imaging magnification of the second lens group with respect to the first lens group when focusing on an object at infinity.

If the value of f2/f is not more than the lower limit defined by conditional expression (1), refractive power of the second lens group G2 which is a focusing group will be strong, spherical aberration which is insufficiently corrected will occur, and spherical aberration in the entire system will become worse. Moreover, aberration fluctuations while focusing will also increase. In order to prevent spherical aberration from becoming worse in a state that the value of f2/f is not more than the lower limit defined by conditional expression (1), the number of lenses of the second lens group G2 will have to be increased. This, however, will make the focusing group heavier.

If the value of f2/f is not lower than the upper limit defined by conditional expression (1), refractive power of the second lens group G2 will be weak, the amount of movement of the second lens group while focusing will increase, and the distance from the aperture stop St to the second lens group G2 when focusing on an object at infinity will be longer. This will increase the lens diameter of the second lens group G2 and will make the focusing group heavier. That is, by satisfying conditional expression (1), aberration while focusing can be suppressed from becoming worse and reduction in weight of the focusing group can be achieved.

If the value of β2 is not more than the lower limit defined by conditional expression (2), refractive power of the second lens group which is a focusing group will be strong and the same problem as in the case that the value of f2/f is not more than the lower limit defined by conditional expression (1) will occur. If the value of β2 is not lower than the upper limit defined by conditional expression (2), refractive power of the second lens group which is a focusing group will be weak and the same problem as in the case that the value of f2/f is not lower than the upper limit defined by conditional expression (1) will occur. That is, by satisfying conditional expression (2), aberration while focusing can be suppressed from becoming worse and reduction in weight of the focusing group can be achieved.

It is preferable for the imaging lens of the present embodiments to satisfy any one of conditional expressions (3) through (7) or to satisfy an arbitrary combination thereof. It is preferable for the configurations given below to be selectively included as appropriate, according to the items required of the imaging lens. For example, the imaging lens of the present embodiments can be suitable as an intermediate telephoto lens by including the above configurations and preferred configurations given below which are selected as appropriate.

$$0.2<|f1a/f1b|<1.6 \quad (3)$$

$$1.0<|f1n/f1a|<6.0 \quad (4)$$

$$0.05<f/f1<0.9 \quad (5)$$

$$45<vn<75 \quad (6)$$

$$0.4<|f3c/f|<2.0 \quad (7), \text{ where}$$

f1a: the focal length of the first sub lens group,
f1b: the focal length of the second sub lens group,
f1n: the focal length of the negative meniscus lens disposed on the most-object side in the entire system,
f1: the focal length of the first lens group,
f: the focal length of the entire system when focusing on an object at infinity,
vn: the Abbe number with respect to the d-line of the negative lens which constitutes the cemented lens on the most-image side in the second sub lens group, and
f3c: the focal length of the cemented lens in the third lens group.

If the value of |f1a/f1b| is not more than the lower limit defined by conditional expression (3), positive refractive power of the first sub lens group G1a will be strong, and thereby both field curvature and spherical aberration cannot be excellently maintained. Even if degradation due to either of these aberrations is corrected by the second sub lens group G1b, it is difficult to reduce both field curvature and spherical aberration together because the correction sensitivity of field curvature is low whereas the correction sensitivity of spherical aberration is high.

If the value of |f1a/f1b| is not lower than the upper limit defined by conditional expression (3), positive refractive power of the first sub lens group G1a will be too weak, the axial light flux which enters the second sub lens group G1b cannot be sufficiently narrowed and the light flux arrives at the second lens group G2 maintaining the diameter of this axial light flux large, so that the diameter of the second lens group G2 will be large and the weight will be increased.

If the value of |f1n/f1a| is not more than the lower limit defined by conditional expression (4), refractive power of the negative meniscus lens of the first sub lens group G1a will be too strong. This will be advantageous from the viewpoint of flattening field curvature, but will make spherical aberration worse. Further, this will also cause the diameter of the axial light flux to be large. If the value of |f1n/f1a| is not lower than the upper limit defined by conditional expression (4), field curvature and lateral chromatic aberration will not be excellently corrected.

If the value of f/f1 is not more than the lower limit defined by conditional expression (5), positive refractive power of the first lens group G1 will be too weak, and thereby the diameter of the axial light flux which enters the second lens group G2 will be large, increase in the diameter and weight will occur, and refractive power of the second lens group will have to be increased. This disadvantageously increases aberration fluctuations while focusing.

If the value of f/f1 is not lower than the upper limit defined by conditional expression (5), refractive power of the first lens group G1 will be too strong and positive refractive power of the second lens group G2 will have to be decreased. This will make the amount of movement of the second lens group G2 while focusing increased, thereby increasing the lens diameter of the second lens group G2 and the weight of the focusing group.

If the value of vn is not more than the lower limit defined by conditional expression (6), chromatic aberration, particularly a secondary spectrum will be deteriorated, and color blur will increase in the entire imaging region, thereby deteriorating imaging performance. If the value of vn is not lower than the upper limit defined by conditional expression (6), refractive power of each of a negative lens and a positive lens has to be increased together in order to establish the achromatic conditions for the cemented lens. This will, however, deteriorate spherical aberration, and make it difficult to achieve the lens system having a small F-number and high performance.

If the value of |f3c/f| is not more than the lower limit defined by conditional expression (7), field curvature will be large. In order to lower field curvature, refractive power of the positive lens, which is disposed immediately adjacent to the cemented lens of the third lens group G3 toward the image side, will be strong. This will makes it difficult to keep a good balance between spherical aberration and off-axis aberration, thereby deteriorating imaging performance in the entire imaging region.

If the value of |f3c/f| is not lower than the upper limit defined by conditional expression (7), a balance of refractive power of the cemented lens of the third lens group G3 and the second lens group G2 will be deteriorated, spherical aberration will be made worse, and it will be difficult to achieve a lens system having a small F-number and high performance.

Taking the above circumstances into consideration, it is more preferable to respectively satisfy conditional expressions (1') through (7') instead of conditional expressions (1) through (7):

$$0.6 < f2/f < 1.6 \quad (1')$$

$$0.06 < \beta2 < 0.6 \quad (2')$$

$$0.3 < |f1a/f1b| < 1.5 \quad (3')$$

$$1.3 < |f1n/f1a| < 4.5 \quad (4')$$

$$0.07 < f/f1 < 0.8 \quad (5')$$

$$50 < vn < 72 \quad (6')$$

$$0.5 < |f3c/f| < 1.8 \quad (7').$$

Next, specific embodiments of the imaging lens of the present invention will be described.

Example 1

The lens configuration of the imaging lens of Example 1 is shown in FIG. 1. Since the manner it is shown is as described above, redundant descriptions thereof will be omitted.

The imaging lens of Example 1 is schematically configured as shown below. That is, the imaging lens consists of a first lens group G1 having positive refractive power, an aperture stop St, a second lens group G2 having positive refractive power, and a third lens group G3 having negative refractive power in this order from the object; the first lens group G1 consists of a first sub lens group G1a having positive refractive power and a second sub lens group G1b having negative refractive power in this order from the object side; the first lens group G1 and the third lens group G3 are fixed while focusing; and the second lens group G2 moves toward the object side while focusing from an object at infinity to an object at the closest distance.

The lenses that constitute each lens group are configured as described below. The first sub lens group G1a consists of lenses L11 through L13, the second sub lens group G1b consists of lenses L14 through L16, the second lens group G2 consists of only a lens L21, and the third lens group G3 consists of lenses L31 through L34.

The lens data of the imaging lens of Example 1 is shown in Table 1. The column Si shows the i-th (i=1, 2, 3, . . . ) surface number, the value of i sequentially increasing from the surface on the object side of the constituent element at the most-object side, which is designated as 1, toward the image side. The column Ri shows the radius of curvature of the i-th surface (i=1, 2, 3, . . . ), and the column Di shows the distances between i-th surfaces and (i+1) st surfaces along the optical axis Z. Note that the sign of the radius of curvature is positive in the case that a surface shape is convex on the object side, and negative in the case that the surface shape is convex on the image side.

Further, the column Ndj shows the refractive index of a j-th (j=1, 2, 3, . . . ) optical element with respect to the d-line (wavelength: 587.56 nm), the value of j sequentially increasing from the constituent element at the most object side, which is designated as 1, toward the image side. The column vdj shows the Abbe number of the j-th optical element with respect to the d-line. Note that the lens data also shows an aperture stop St and an optical member PP. Further, the column of the surface number of a surface corresponding to the aperture stop St indicates a surface number and the letters (St). The column of the surface number of a surface corresponding to the image surface indicates a surface number and the letters (IMG).

The symbol "f" which is indicated below the term "Example 1" of Table 1 refers to the focal length of the entire system when focusing on an object at infinity, the symbol "FNo." refers to a F-number, and the symbol "2ω" refers to the full angle of view. The values shown in Table 1 are in a case of focusing on an object at infinity and are normalized such that the focal length of the entire system when focusing on an object at infinity becomes 1.000, which are related to the d-line. Further, the numerical values of each Table shown below are rounded to a predetermined number of digits.

TABLE 1

EXAMPLE 1
f = 1.000, FNo. = 1.9, 2ω = 21.2°

| Si | Ri | Di | Ndj | vdj |
|---|---|---|---|---|
| 1 | 1.0103229 | 0.02093 | 1.58144 | 40.75 |
| 2 | 0.4673189 | 0.08371 | | |
| 3 | 0.5855408 | 0.08369 | 1.80000 | 29.84 |
| 4 | 2.6773080 | 0.00986 | | |
| 5 | 0.4034090 | 0.11794 | 1.49700 | 81.54 |
| 6 | −13.2196793 | 0.08077 | | |
| 7 | 6.7074525 | 0.02991 | 1.66680 | 33.05 |
| 8 | 0.2818588 | 0.11290 | | |
| 9 | −0.6398736 | 0.02093 | 1.51633 | 64.14 |
| 10 | 0.2863700 | 0.13651 | 1.49700 | 81.54 |
| 11 | −0.7014285 | 0.02093 | | |
| 12 (St) | ∞ | 0.15110 | | |
| 13 | 0.4615308 | 0.06385 | 1.49700 | 81.54 |
| 14 | −2.7569808 | 0.03328 | | |
| 15 | 1 0024938 | 0.10467 | 1.58913 | 61.14 |
| 16 | −0.3109459 | 0.01570 | 1.71736 | 29.52 |
| 17 | 0.4391320 | 0.10467 | | |
| 18 | 0.8647515 | 0.10985 | 1.80518 | 25.42 |
| 19 | −0.4923973 | 0.10373 | | |
| 20 | −0.3740708 | 0.01570 | 1.51742 | 52.43 |
| 21 | 3.3575728 | 0.05233 | | |
| 22 | ∞ | 0.02407 | 1.51632 | 64.00 |
| 23 | ∞ | 0.24278 | | |
| 24 (IMG) | ∞ | | | |

A through E of FIG. 7 respectively show aberration diagrams of spherical aberration, offense against the sine condition, astigmatism, distortion, and lateral chromatic aberration of the imaging lens of Example 1 when focusing on an object at infinity. These aberration diagrams are in the case that the focal length of the entire system when focusing on an object at infinity is normalized to be 1.000.

Each aberration diagram is with respect to the d-line (wavelength: 587.56 nm), but the spherical aberration diagrams also illustrates aberrations with respect to the g-line (wavelength: 435.84 nm), the F-line (wavelength: 486.13 nm) and C-line (wavelength: 656.27 nm), and the lateral chromatic aberration diagrams illustrate aberrations with respect to the F-line and the C-line. In the astigmatism diagrams, the solid line illustrates astigmatism in the sagittal direction while the dotted line illustrates astigmatism in the tangential direction. FNo, in the spherical aberration and offense against the sine condition diagrams represents the F-number and ω in the other aberration diagrams represents the half angle of view.

Values corresponding to conditional expressions (1) through (7) of the imaging lens of Example 1 are shown with those of the other Examples in Table 7 to be shown below.

The points regarding the symbols that represent each item of data, the meanings thereof, and the manners in which they are shown are those for when focusing on an object at infinity; and that the numerical values are normalized such that the focal distance of the entire system at the wide angle end is 1.000 apply to the Examples to be described below, unless otherwise noted. Accordingly, redundant descriptions thereof will be omitted.

Example 2

Figure 2:
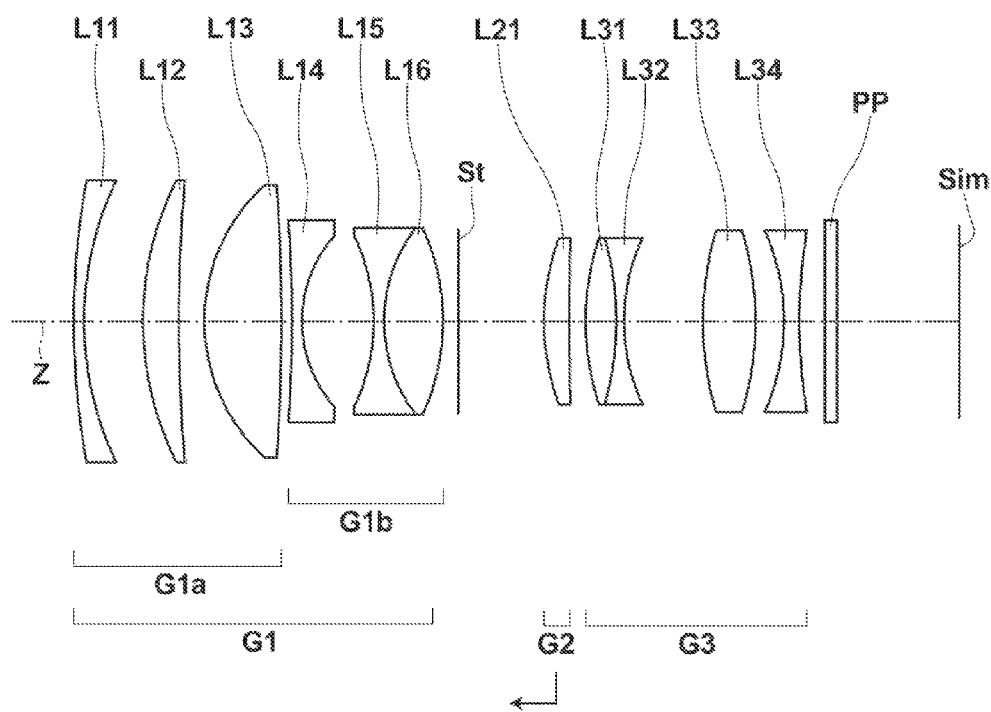
FIG. 2 is a cross-sectional view illustrating the lens configuration of an imaging lens of Example 2 of the present invention.

FIG. 2 shows the lens configuration diagram of the imaging lens of Example 2. The schematic configuration of the imaging lens of Example 2 is the same as that of Example 1. Table 2 shows lens data of the imaging lens of Example 2. A through E of FIG. 8 respectively show aberration diagram of the imaging lens of Example 2.

TABLE 2

EXAMPLE 2
f = 1.000, FNo. = 2.3, 2ω = 22.8°

| Si | Ri | Di | Ndj | vdj |
|---|---|---|---|---|
| 1 | 1.7443773 | 0.02199 | 1.60342 | 38.03 |
| 2 | 0.7174787 | 0.12665 | | |
| 3 | 0.6882390 | 0.07700 | 1.80100 | 34.97 |
| 4 | 3.5629482 | 0.05498 | | |
| 5 | 0.4070250 | 0.16518 | 1.49700 | 81.54 |
| 6 | −4.3589970 | 0.02240 | | |
| 7 | −3.1771794 | 0.02199 | 1.54814 | 45.79 |
| 8 | 0.2862833 | 0.15395 | | |
| 9 | −0.4292820 | 0.02199 | 1.51633 | 64.14 |
| 10 | 0.3385717 | 0.12646 | 1.49700 | 81.54 |
| 11 | −0.4963717 | 0.03299 | | |
| 12 (St) | ∞ | 0.18347 | | |
| 13 | 0.5232582 | 0.05498 | 1.49700 | 81.54 |
| 14 | 10.9019020 | 0.03503 | | |
| 15 | 0.5879067 | 0.06598 | 1.58913 | 61.14 |
| 16 | −0.6597250 | 0.01649 | 1.68893 | 31.07 |
| 17 | 0.4388050 | 0.16903 | | |
| 18 | 0.7018087 | 0.11291 | 1.80000 | 29.84 |
| 19 | −0.6786830 | 0.06115 | | |
| 20 | −0.4944473 | 0.03299 | 1.58144 | 40.75 |
| 21 | 1.2213061 | 0.05498 | | |
| 22 | ∞ | 0.02529 | 1.51632 | 64.00 |
| 23 | ∞ | 0.26283 | | |
| 24 (IMG) | ∞ | | | |

Example 3

FIG. 3 shows the lens configuration diagram of the imaging lens of Example 3. The schematic configuration of the imaging lens of Example 3 is the same as that of Example 1. The imaging lens of Example 3 differs from the imaging lens of Example 1 in that the second sub lens group G1b consists of lenses L14 through L17 and the second lens group G2 consists of lenses L21 and L22.

Table 3 shows lens data of the imaging lens of Example 3. A through E of FIG. 9 respectively show aberration diagrams of the imaging lens of Example 3.

TABLE 3

EXAMPLE 3
f = 1.000, FNo. = 2.5, 2ω = 20.8°

| Si | Ri | Di | Ndj | vdj |
|---|---|---|---|---|
| 1 | 1.7226678 | 0.02068 | 1.60342 | 38.03 |
| 2 | 0.6640915 | 0.15491 | | |
| 3 | 1.7142090 | 0.07230 | 1.80610 | 33.27 |
| 4 | 6.2539286 | 0.05164 | | |
| 5 | 0.6866482 | 0.10134 | 1.49700 | 81.54 |
| 6 | −1.8132252 | 0.00207 | | |

TABLE 3-continued

EXAMPLE 3
f = 1.000, FNo. = 2.5, 2ω = 20.8°

| Si | Ri | Di | Ndj | vdj |
|---|---|---|---|---|
| 7 | 0.3738697 | 0.10536 | 1.49700 | 81.54 |
| 8 | 0.8788660 | 0.02066 | 1.51633 | 64.14 |
| 9 | 0.2649178 | 0.16799 | | |
| 10 | −0.4229182 | 0.02066 | 1.51633 | 64.14 |
| 11 | 0.3442795 | 0.14458 | 1.49700 | 81.54 |
| 12 | −0.4676289 | 0.03098 | | |
| 13 (St) | ∞ | 0.17232 | | |
| 14 | 1.3531152 | 0.01859 | 1.54814 | 45.79 |
| 15 | 0.2697617 | 0.07746 | 1.61800 | 63.33 |
| 16 | −8.3589661 | 0.03291 | | |
| 17 | 2.1545302 | 0.04648 | 1.80518 | 25.42 |
| 18 | −1.5480089 | 0.01549 | 1.58144 | 40.75 |
| 19 | 0.3039479 | 0.13397 | | |
| 20 | 0.5236696 | 0.10605 | 1.61800 | 63.33 |
| 21 | −0.5533321 | 0.09321 | | |
| 22 | −0.6404400 | 0.3098 | 1.62004 | 36.26 |
| 23 | 3.1300782 | 0.05164 | | |
| 24 | ∞ | 0.02375 | 1.51632 | 64.00 |
| 25 | ∞ | 0.23853 | | |
| 26 (IMG) | ∞ | | | |

Example 4

Figure 4:
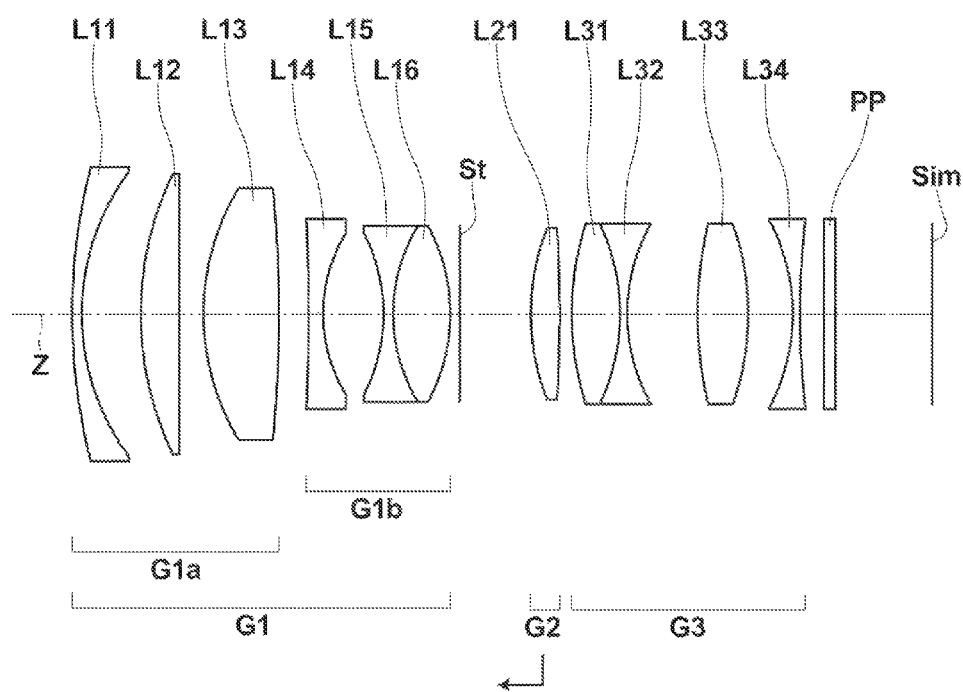
FIG. 4 is a cross-sectional view illustrating the lens configuration of an imaging lens of Example 4 of the present invention.

FIG. 4 shows the lens configuration diagram of the imaging lens of Example 4. The schematic configuration of the imaging lens of Example 4 is the same as that of Example 1. Table 4 shows lens data of the imaging lens of Example 4. A through E of FIG. 10 respectively show aberration diagram of the imaging lens of Example 4.

TABLE 4

EXAMPLE 4
f = 1.000, FNo. = 2.3, 2ω = 22.6°

| Si | Ri | Di | Ndj | vdj |
|---|---|---|---|---|
| 1 | 1.4157367 | 0.02247 | 1.58144 | 40.75 |
| 2 | 0.5716640 | 0.13749 | | |
| 3 | 0.7716430 | 0.08987 | 1.80610 | 33.27 |
| 4 | 104.4543287 | 0.05616 | | |
| 5 | 0.5854917 | 0.17537 | 1.51633 | 64.14 |
| 6 | −3.0301381 | 0.06903 | | |
| 7 | −4.2381338 | 0.03331 | 1.66680 | 33.05 |
| 8 | 0.3685510 | 0.14027 | | |
| 9 | −0.4211433 | 0.02247 | 1.51633 | 64.14 |
| 10 | 0.4023844 | 0.13294 | 1.49700 | 81.54 |
| 11 | −0.4395653 | 0.02247 | | |
| 12 (St) | ∞ | 0.16470 | | |
| 13 | 0.5622059 | 0.06740 | 1.49700 | 81.54 |
| 14 | −3.1912739 | 0.02808 | | |
| 15 | 0.7096600 | 0.11233 | 1.58913 | 61.14 |
| 16 | −0.5024245 | 0.01685 | 1.71736 | 29.52 |
| 17 | 0.4414187 | 0.16336 | | |
| 18 | 0.9280947 | 0.11789 | 1.80518 | 25.42 |
| 19 | −0.6419706 | 0.10331 | | |
| 20 | −0.4755105 | 0.01685 | 1.51742 | 52.43 |
| 21 | 2.0737815 | 0.05616 | | |
| 22 | ∞ | 0.02584 | 1.51632 | 64.00 |
| 23 | ∞ | 0.22499 | | |
| 24 (IMG) | ∞ | | | |

Example 5

Figure 5:
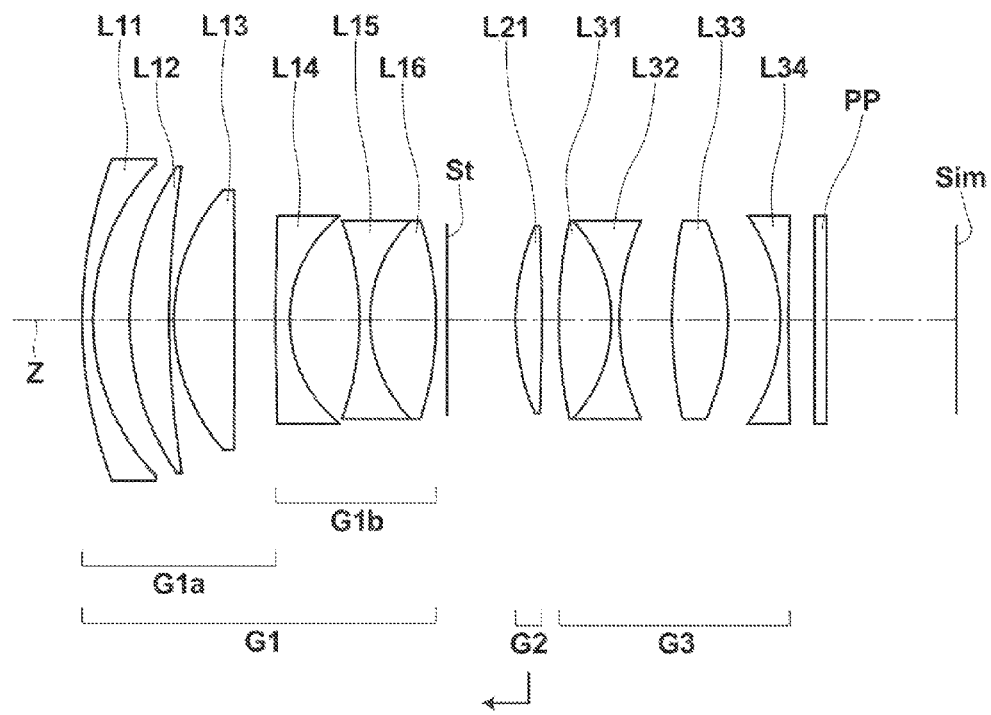
FIG. 5 is a cross-sectional view illustrating the lens configuration of an imaging lens of Example 5 of the present invention.

FIG. 5 shows the lens configuration diagram of the imaging lens of Example 5. The schematic configuration of the imaging lens of Example 5 is the same as that of Example 1. Table 5 shows lens data of the imaging lens of Example 5. A through EA through E of FIG. 11 respectively show aberration diagram of the imaging lens of Example 5.

TABLE 5

EXAMPLE 5
f = 1.000, FNo. = 2.3, 2ω = 21.4°

| Si | Ri | Di | Ndj | νdj |
|---|---|---|---|---|
| 1 | 0.9247888 | 0.02098 | 1.58144 | 40.75 |
| 2 | 0.4564845 | 0.07299 | | |
| 3 | 0.5524065 | 0.07920 | 1.80000 | 29.84 |
| 4 | 1.9063589 | 0.00951 | | |
| 5 | 0.3988117 | 0.11943 | 1.49700 | 81.54 |
| 6 | −31.5798215 | 0.08211 | | |
| 7 | 6.1523934 | 0.02803 | 1.66680 | 33.05 |
| 8 | 0.2709331 | 0.13858 | | |
| 9 | −0.5801050 | 0.02098 | 1.48749 | 70.23 |
| 10 | 0.2860461 | 0.13110 | 1.49700 | 81.54 |
| 11 | −0.6521566 | 0.02098 | | |
| 12 (St) | ∞ | 0.13659 | | |
| 13 | 0.4819805 | 0.05244 | 1.49700 | 81.54 |
| 14 | −4.0298586 | 0.03341 | | |
| 15 | 0.9567243 | 0.10488 | 1.58913 | 61.14 |
| 16 | −0.3000999 | 0.01573 | 1.71736 | 29.52 |
| 17 | 0.4828300 | 0.10488 | | |
| 18 | 0.9993261 | 0.11007 | 1.80518 | 25.42 |
| 19 | −0.4803234 | 0.10488 | | |
| 20 | −0.3701169 | 0.01573 | 1.51742 | 52.43 |
| 21 | 6.9356694 | 0.05244 | | |
| 22 | ∞ | 0.02412 | 1.51632 | 64.00 |
| 23 | ∞ | 0.25677 | | |
| 24 (IMG) | ∞ | | | |

Example 6

Figure 6:
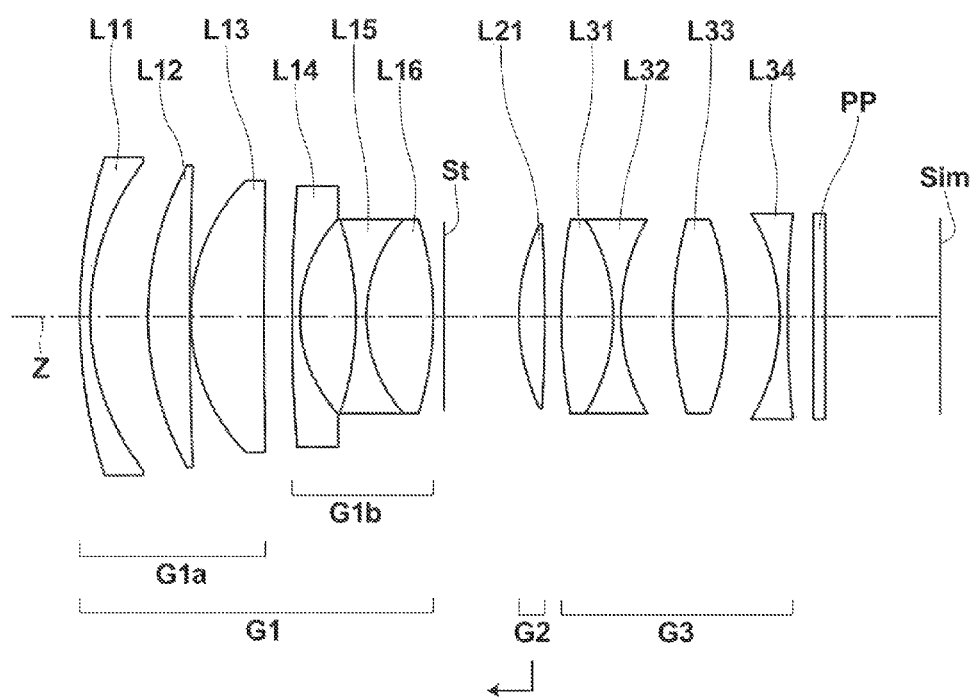
FIG. 6 is a cross-sectional view illustrating the lens configuration of an imaging lens of Example 6 of the present invention.

FIG. 6 shows the lens configuration diagram of the imaging lens of Example 6. The schematic configuration of the imaging lens of Example 6 is the same as that of Example 1. Table 6 shows lens data of the imaging lens of Example 6. A through E of FIG. 12 respectively show aberration diagram of the imaging lens of Example 6.

TABLE 6

EXAMPLE 6
f = 1.000, FNo. = 2.3, 2ω = 21.0°

| Si | Ri | Di | Ndj | νdj |
|---|---|---|---|---|
| 1 | 1.0642017 | 0.02062 | 1.58144 | 40.75 |
| 2 | 0.5085165 | 0.11492 | | |
| 3 | 0.6317055 | 0.08251 | 1.80000 | 29.84 |
| 4 | 6.8173768 | 0.00206 | | |

TABLE 6-continued

EXAMPLE 6
f = 1.000, FNo. = 2.3, 2ω = 21.0°

| Si | Ri | Di | Ndj | νdj |
|---|---|---|---|---|
| 5 | 0.3987793 | 0.14564 | 1.49700 | 81.54 |
| 6 | 16.8650236 | 0.05530 | | |
| 7 | 3.4764624 | 0.01547 | 1.66680 | 33.05 |
| 8 | 0.2909902 | 0.11119 | | |
| 9 | −0.6126875 | 0.02062 | 1.51742 | 52.43 |
| 10 | 0.2954432 | 0.13256 | 1.43875 | 94.93 |
| 11 | −0.6557125 | 0.02062 | | |
| 12 (St) | ∞ | 0.14892 | | |
| 13 | 0.4392788 | 0.05154 | 1.49700 | 81.54 |
| 14 | −2.9032951 | 0.03284 | | |
| 15 | 1.0384115 | 0.10308 | 1.58913 | 61.14 |
| 16 | −0.3716181 | 0.01546 | 1.71736 | 29.52 |
| 17 | 0.3932337 | 0.10308 | | |
| 18 | 0.6966758 | 0.10818 | 1.80518 | 25.42 |
| 19 | −0.5527062 | 0.10308 | | |
| 20 | −0.4087779 | 0.01546 | 1.51742 | 52.43 |
| 21 | 2.0186147 | 0.05154 | | |
| 22 | ∞ | 0.02371 | 1.51632 | 64.00 |
| 23 | ∞ | 0.22770 | | |
| 24 (IMG) | ∞ | | | |

Table 7 shows values corresponding to conditional expressions (1) through (7) of Examples 1 through 6 above. Note that the values shown in FIG. 7 are based on the d-line.

TABLE 7

| | Conditional Expressions | EXAMPLE 1 | EXAMPLE 2 | EXAMPLE 3 | EXAMPLE 4 | EXAMPLE 5 | EXAMPLE 6 |
|---|---|---|---|---|---|---|---|
| (1) | f2/f | 0.8008 | 1.1040 | 1.3623 | 0.9675 | 0.8696 | 0.7717 |
| (2) | β2 | 0.0836 | 0.1789 | 0.5092 | 0.1407 | 0.0962 | 0.1127 |
| (3) | |f1a/f1b| | 1.2757 | 1.1353 | 0.4478 | 1.1111 | 1.2570 | 1.2767 |
| (4) | |f1n/f1a| | 2.6443 | 3.7047 | 1.6127 | 2.6035 | 2.6851 | 3.2028 |
| (5) | f/f1 | 0.0810 | 0.1443 | 0.5141 | 0.1276 | 0.0873 | 0.1133 |
| (6) | νn | 64.14 | 64.14 | 64.14 | 64.14 | 70.23 | 52.43 |
| (7) | |f3c/f| | 0.7266 | 1.5762 | 0.7310 | 1.0748 | 0.8219 | 0.6586 |

Next, referring to FIG. 13, the imaging apparatus according to the embodiments of the present invention will be described. FIG. 13 shows a schematic configuration diagram of the imaging apparatus including the imaging lens 1 according to the embodiments of the present invention as one example of the imaging apparatus of the embodiment of the present invention. The imaging apparatus includes a film camera, a digital camera, a broadcasting camera, a movie camera, and the like, for example. The imaging lens according to the present embodiments can be applied as an exchangeable lens of such cameras, for example.

The imaging apparatus 10 shown in FIG. 13 includes an imaging lens 1; a filter 2, which is disposed on the image side of the imaging lens 1; an imaging element 3 which captures an image of a subject formed by the imaging lens 1; a signal processing section 4 which computes a signal output from the imaging element 3; and a focus control section 5. The imaging lens 1 includes a first lens group G1, an aperture stop St, a second lens group G2, and a negative third lens group G3. The first lens group G1 consists of a first sub lens group G1a and a second sub lens group G1b. Note that FIG. 13 conceptually shows each of the lens groups.

The imaging element 3 captures an image of a subject formed by the imaging lens 1 and converts the image into an electric signal. The imaging element 3 is disposed such that the imaging surface thereof matches the image surface of the imaging lens 1. A CCD (Charge Coupled Device), a CMOS (Complementary Metal Oxide Semiconductor), or the like may be employed as the imaging element 3, for example. The imaging apparatus 10 is configured such that focusing is performed by moving the second lens group G2 in the direction of the optical axis by the focus control section 5 when the object distance is changed.

The present invention has been described with reference to the Embodiments and Examples. The present invention is not limited to the embodiments and the examples described above, and various modifications are possible. For example, values, such as the radius of curvature, the distances between surfaces, the refractive indices, the Abbe numbers of each lens, and the like are not limited to the values in the numerical examples shown in the Tables, but may be other values.

What is claimed is:

1. An imaging lens substantially consisting of three lens groups in which a first lens group which is fixed while focusing, a stop, a second lens group having positive refractive power which moves toward the object side while focusing from an object at infinity to an object at the closest distance, and a third lens group which is fixed while focusing are arranged in this order from the object side;

the first lens group substantially consists of a first sub lens group having positive refractive power and a second sub lens group having negative refractive power in this order from the object side;

the first sub lens group substantially consists of a negative meniscus lens with a convex surface toward the object side, a positive meniscus lens with a convex surface toward the object side, and a positive lens in this order from the object side;

the second sub lens group includes a negative lens with a concave surface toward the image side, of which an absolute value of a radius of curvature on an image-side surface is smaller than that on the object side, and a cemented lens formed by cementing a negative lens and a positive lens together, in this order from the object side;

the second lens group substantially consists of a positive single lens or a cemented lens formed by cementing a negative lens and a positive lens together;

the third lens group substantially consists of a cemented lens formed by cementing a positive lens and a negative lens together, a positive lens, and a negative lens in this order from the object side; and conditional expressions (1) and (2) below are satisfied:

$$0.4 < f2/f < 2.0 \quad (1)$$

$$0.05 < \beta2 < 0.8 \quad (2), \text{ where}$$

f2: the focal length of the second lens group,
f: the focal length of the entire system when focusing on an object at infinity, and β2: the image magnification of the second lens group with respect to the first lens group when focusing on an object at infinity.

2. The imaging lens of claim 1, wherein conditional expression (1') below is satisfied:

$$0.6 < f2/f < 1.6 \quad (1').$$

3. The imaging lens of claim 1, wherein conditional expression (2') below is satisfied:

$$0.06 < \beta2 < 0.6 \quad (2').$$

4. The imaging lens of claim 1, wherein conditional expression (3) below is satisfied:

$$0.2 < |f1a/f1b| < 1.6 \quad (3), \text{ where}$$

f1a: the focal length of the first sub lens group, and
f1b: the focal length of the second sub lens group.

5. The imaging lens of claim 4, wherein conditional expression (3') below is satisfied:

$$0.3 < |f1a/f1b| < 1.5 \quad (3').$$

6. The imaging lens of claim 1, wherein conditional expression (4) below is satisfied:

$$1.0 < |f1n/f1a| < 6.0 \quad (4), \text{ where}$$

f1a: the focal length of the first sub lens group, and
f1n: the focal length of the negative meniscus lens of the first sub lens group.

7. The imaging lens of claim 6, wherein conditional expression (4') below is satisfied:

$$1.3 < |f1n/f1a| < 4.5 \quad (4').$$

8. The imaging lens of claim 1, wherein conditional expression (5) below is satisfied:

$$0.05 < f/f1 < 0.9 \quad (5), \text{ where}$$

f1: the focal length of the first lens group.

9. The imaging lens of claim 8, wherein conditional expression (5') below is satisfied:

$$0.07 < f/f1 < 0.8 \quad (5').$$

10. The imaging lens of claim 1, wherein conditional expression (6) below is satisfied:

$$45 < \nu n < 75 \quad (6), \text{ where}$$

νn: the Abbe number with respect to the d-line of the negative lens which constitutes the cemented lens on the most-image side in the second sub lens group.

11. The imaging lens of claim 10, wherein conditional expression (6') below is satisfied:

$$50 < \nu n < 72 \quad (6').$$

12. The imaging lens of claim 1, wherein conditional expression (7) below is satisfied:

$$0.4 < |f3c/f| < 2.0 \quad (7), \text{ where}$$

f3c: the focal length of the cemented lens of the third lens group.

13. The imaging lens of claim 12, wherein conditional expression (7') below is satisfied:

$$0.5 < |f3c/f| < 1.8 \quad (7').$$

14. An imaging apparatus comprising the imaging lens of claim 1.

* * * * *